United States Patent Office 3,254,085
Patented May 31, 1966

3,254,085
4,7-DIAMINO-6-PTERIDINECARBOXAMIDES
Thomas S. Osdene, Berwyn, Pa., assignor to American Home Products Corporation, New York, N.Y., a corporation of Delaware
No Drawing. Filed Jan. 13, 1964, Ser. No. 337,177
12 Claims. (Cl. 260—251.5)

The invention herein disclosed is concerned with compositions of matter classified in the art of chemistry as 4,7-diamino-6-pteridinecarboxamides and to a process for making these compounds.

In its composition aspect, the invention sought to be patented resides in the concept of chemical compounds having the 4,7-diamino-6-pteridinecarboxamide structure in which there is attached to the nitrogen atom of the 7-amino group a substituted or unsubstituted alkyl group, or their hereinafter disclosed equivalents.

The invention sought to be patented, in its process aspect, resides in the concept of a reaction wherein a malonamide unsubstituted in the 2-position is condensed with a 4,6-diamino-5-nitrosopyrimidine, with the elimination of water and the retention of the amino groups of the malonamide.

The tangible embodiments of the composition aspect of this invention possess the inherent physical properties of being relatively high melting solids, are substantially insoluble in cold water and are generally soluble in polar solvents such as lower aliphatic alcohols. Examinations of compounds produced according to the hereinafter described process reveals data confirming the molecular structure hereinbefore set forth. For example the NH and carbonyl frequencies are evident in the infrared spectra. The aforementioned physical characteristics, taken together with the nature of the starting materials and the mode of synthesis positively confirm the structure of the composition sought to be patented.

The tangible embodiments of the composition aspect of this invention possess the inherent applied use characteristic of exerting qualitatively varying therapeutic effects as evidenced by pharmacological evaluation according to standard test procedures. These tangible embodiments show antiinflammatory, antibacterial and diuretic activities.

The manner and process of making and using the invention will now be generally described so as to enable a person skilled in the art of chemistry to make and use the same as follows:

The new process of this invention is illustrated schematically for a specific embodiment in Scheme A, below, and more generally in Scheme B, to which the numerals in parenthesis in the following description refer.

SCHEME A

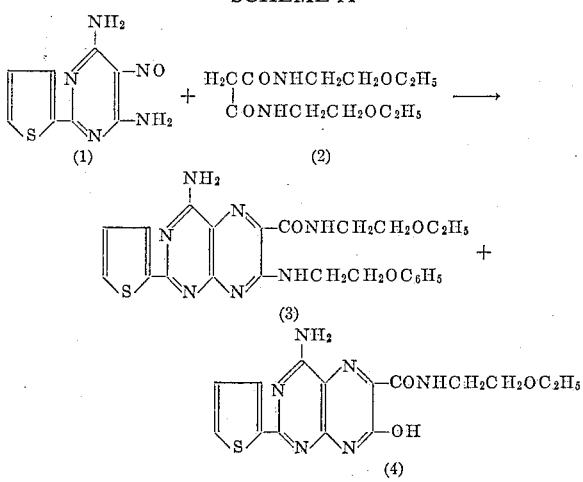

SCHEME B

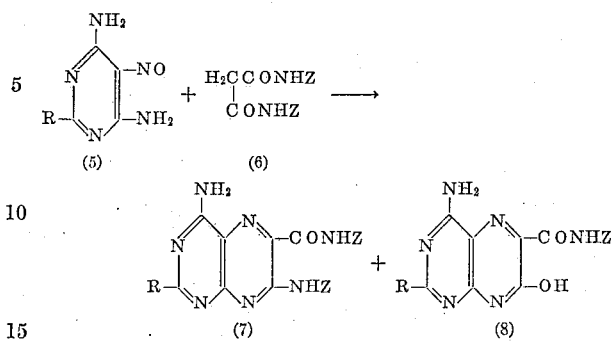

The claimed compositions are prepared by condensing in a solvent such as a lower alkanol under anhydrous conditions a 4,6-diamino-5-nitrosopyrimidine (1)(5) with a malonamide (2)(6) to form the desired 4,7-diamino-6-pteridinecarboxamide (3)(7) and a small amount of a 4-amino-7-hydroxy-6-pteridinecarboxamide (4)(8). It is altogether surprising and unexpected that the subject condensation reaction should proceed as it does primarily with the retention of the amino group of the malonamide and elimination of water. Those skilled in the art could expect here the normal result of a condensation involving malonamide, i.e., largely elimination of ammonia and very little water. Stated another way, only 4-amino-7-hydroxy - 6 - pteridinecarboxamides (4)(8) would be expected.

This condensation preferably is carried out at the reflux temperature of the lower alkanol solvent and in the presence of a catalytic amount of a basic catalyst such as for example but without limitation the alkali metals, their alkoxides and their alkoxyalkoxides, preferably sodium metal, sodium methoxide, potassium ethoxide and sodium alpha-ethoxyethoxide.

The 4 - amino - 5 - nitroso pyrimidines and the malonamides employed as starting products in the present process are generally known or are readily prepared by procedures known to those skilled in the art. The preferred synthesis for certain of the malonamides is given hereinafter in the examples.

It will be apparent from the disclosure herein to those skilled in the art of organic chemistry that the condensation reaction occurring in the process aspect of this invention can be carried out with any malonamide as long as the number 2-carbon atom thereof is unsubstituted. The malonamide can have on the nitrogen atoms thereof substituent groups (Scheme B, Z) such as, for example, but without limitations, hydrogen, alkyl up to and including hexyl; alkoxyalkyl, for example, methoxyethyl; dialkylaminoalkyl, for example diethylaminoethyl; morpholinoalkyl, for example, morpholinoethyl; piperidinoalkyl, for example, piperidinoethyl and alkylthioalkyl, for example, ethylthioethyl.

It will be apparent to those skilled in the art to which this invention appertains, that the aforesaid condensation reaction can be carried out with any 4,6-diamino-5-nitroso pyrimidine. Thus there can be in the 2-position of the starting pyrimidines such substituents (Scheme B, R) as hydrogen, phenyl, 2-, or 3-trienyl, alkyl, halo(lower)alkyl phenyl, such as, for example, but without limitation, trifluromethylphenyl, halophenyl such as o-, p-, or m-chlorophenyl, alkoxyphenyl, such as o-, p-, or m-methoxyphenyl or alkylphenyl, such as, for example, but without limitation, o-, p-, or m-tolyl.

When the starting compounds are substituted as hereinbefore recited, it will be apparent to those skilled in the art that the final products formed by the process of the invention will bear, correspondingly the same substituents.

Such substituted compounds are the full equivalents of the invention as particularly claimed.

The best mode contemplated by the inventor for carrying out his invention will now be set forth as follows:

*Example 1*

PREPARATION OF STARTING MATERIAL

Reflux a mixture of 32.0 g. of 2-ethoxyethylamine and 38.0 g. of diethylmalonate for 4 hours. Remove the ethanol formed in the reaction on a rotary evaporator. Cool the residue to solidify the product. Recrystallize from ethyl acetate to afford N,N'-bis(2-ethoxyethyl) malonamide, M.P. 117° C.

PREPARATION OF 4-AMINO - N - (2-ETOXYETHYL)-7-(2-ETHOXYETHYLAMINO) - 2 - (2 - THIENYL)-6-PTERIDINE-CARBOXAMIDE

Add to a solution of 0.4 g. of sodium in 400 ml. of absolute ethanol 6.64 g. of 4,6 - diamino - 5- nitroso - 2 - (2-thienyl)-pyrimidine and 8.13 g. of N,N'-bis(2-ethoxyethyl)malonamide. Reflux the mixture and boil for 30 mins. during which time a small amount of brown precipitate will be obtained. Cool and remove the precipitate by filtration and evaporate the filtrate to dryness under reduced pressure. Treat the residue with water and recrystallize the resulting yellow material from aqueous ethanol to give 4-amino-N-(2-ethoxyethyl)-7-(2-ethoxyethylamino) - 2 - (2-thienyl-6-pteridinecarboxamide, M.P. 149° C.

The following examples illustrate the preparation of other compositions of the invention.

*Example 2*

Reflux a mixture of 75 g. of 2-methoxyethylamine and 80 g. of diethylmalonate for 5 hours. Concentrate the solution on a rotary evaporator to solidify the residual oil on cooling. Recrystallize from benzene to afford N,N'-bis(2-methoxyethyl)malonamide, M.P. 91–92° C.

Add to a solution of 0.5 g. of sodium in 250 ml. of dry 2-ethoxyethanol 2.8 g. of 4,6-diamino-5-nitrosopyrimidine and 4.8 g. of N,N'-bis(2-methoxyethyl)malonamide. Stir the mixture and boil under reflux for 10 mins. during which time a brown precipitate deposits. Filter and concentrate the filtrate to give an oil. Dissolve in ethanol and add five times the volume of ether. Filter off a brown precipitate and discard. Concentrate the filtrate to obtain a yellow material. Recrystallize from ethanol to obtain 4-amino-N-(2-methoxyethyl)-7-(2 - methoxyethylamino)-6-pteridinecarboxamide, M.P. 210° C.

*Example 3*

Reflux a mixture of 100 g. of n-hexylamine and 80 g. of diethylmalonate for 5 hours. Cool to solidify the mass. Recrystallize from ethyl acetate to give N,N'-dihexylmalonamide, M.P. 129° C.

Add to a solution of 0.2 g. of sodium in 400 ml. of absolute ethanol 4.30 g. of 4,6-diamino-5-nitroso-2-phenylpyrimidine, followed by N,N'-dihexylmalonamide. Reflux the mixture and stir for 1 hour, during which time a precipitate will slowly deposit from solution. After cooling, remove the precipitate by filtration, and evaporate the filtrate to dryness on a rotary evaporator to obtain a residue, M.P. 194° C., wt.=5.0 g. Recrystallize from aqueous ethanol to yield 4-amino-N-hexyl-7-hexylamino-2-phenyl-6-pteridinecarboxamide, M.P. 197° C.

*Example 4*

Reflux a mixture of 17.6 g. of diethylmalonate and 23.1 g. of 2-ethylthioethylamine for 3 hours. Allow to stand to obtain a white solid. Recrystallize from benzene to yield N,N' - bis(2 - ethylthioethyl)malonamide, M.P. 120° C.

Add to a solution of 0.8 g. in 500 ml. of absolute ethanol 6.45 g. of 4,6-diamino-5-nitroso-2-phenylpyrimidine and 8.13 g. of N,N'-bis(2-ethylthioethyl)malonamide. Stir the mixture and boil under reflux for 30 mins. Cool to deposit a yellow precipitate from solution. Remove by filtration. Obtain a further precipitate by allowing the mother liquor to stand. Extract the combined precipitate with boiling water and recrystallize the residual material from ethanol to afford 4-amino-N-(2-ethylthioethyl - 7 - (2-ethylthioethylamino) - 2 - phenyl - 6-pteridinecarboxamide, M.P. 195° C.

*Example 5*

Add to a solution of 0.8 g. of sodium in 500 ml. of absolute ethanol 6.64 g. of 4,6-diamino-5-nitroso-2-(2-thienyl)-pyrimidine and 7.2 g. of N,N'-bis(2-methoxyethyl)malonamide prepared as in Example 2. Reflux the mixture with stirring for 15 mins., and then cool to form a small amount of dark precipitate. Remove the solid by filtration and discard. Evaporate the filtrate to dryness on a rotary evaporator to give an orange solid, wt.=12.3 g. Extract this solid with boiling water and recrystallize the insoluble residue from ethanol, affording 4 - amino-(2-methoxyethyl)-7-(2-methoxyethylamino)-2-(2-thienyl)-6-pteridinecarboxamide, M.P. 220° C.

*Example 6*

Add to a solution of 0.2 g. of sodium in 400 ml. of absolute ethanol 6.45 g. of 4,6-diamino-5-nitroso-2-phenylpyrimidine, followed by 10.62 g. of N,N'-bis(2-diethylaminoethyl)malonamide. Stir and reflux the mixture for 90 mins. Then add a solution of 0.8 g. of sodium in 20 ml. of dry 2-ethoxyethanol. After 15 mins. of further heating, the color of the solution will turn amber. Evaporate the solution to dryness and recrystallize the residue several times from aqueous ethanol to give 4-amino - N-(2-diethylaminoethyl)-7-(2-diethylaminoethylamino)-2-phenyl-6-pteridinecarboxamide, M.P. 190° C.

*Example 7*

Add to a solution of 0.89 g. of sodium in 500 ml. of absolute ethanol 6.45 g. of 4,6-diamino-5-nitroso-2-phenylpyrimidine, followed by 7.2 g. of N,N'-bis(2-methoxyethyl)malonamide. Stir and boil the mixture under reflux for 15 mins., during which time the color will change to yellow. Cool to obtain a yellow precipitate, wt.=13 g. Extract this material with boiling water and recrystallize the residue (M.P. 234° C.,) from ethanol to give 4 - amino-N-(2-methoxyethyl)-7-(2-methoxyethylamino)-2-phenyl-6-pteridinecarboxamide, M.P. 234°, wt.=7.0 g.

*Example 8*

Add to a solution of 0.23 g. of sodium in 500 ml. of dried 2-ethoxyethanol 7.49 g. of 4,6-diamino-2-(p-chlorophenyl)-5-nitrosopyrimidine and 8.31 g. of N,N'-bis(2-ethoxyethyl)malonamide. Reflux and stir the mixture under reflux for 30 mins. Add 0.46 g. more of sodium dissolved in 10 ml. of 2-ethoxyethanol to the mixture and continue heating for a further 5 mins., during which time the color of the solution will change from green to yellow. Evaporate the solution to dryness and treat the residue with 300 ml. of water. Remove the yellow material so obtained by filtration and recrystallize from ethanol to afford 4-amino-2-(p-chlorophenyl)-N-(2-ethoxyethyl) - 7 - (2-ethoxyethylamino)-6-pteridinecarboxamide, M.P. 218° C.

*Example 9*

Add to a solution of 0.2 g. of sodium in 400 ml. of absolute ethanol 6.45 g. of 4,6-diamino-5-nitroso-2-phenylpyrimidine, followed by 8.0 g. of N,N'-bis(2-ethoxyethyl)malonamide. Reflux and stir the mixture for 1 hour during which time the color of the solution turns to light amber. Evaporate the solution to dryness on a rotary evaporator and treat the residue with 100 ml. of water. Filter the resulting solid (M.P. 184° C.). Recrystallize this material from ethanol to afford 4-amino-N - (2 - ethoxyethyl)-7-(2-ethoxyethylamino)-2-phenyl-6-pteridinecarboxamide, M.P. 188° C.

Example 10

Add to a solution of 0.2 g. of sodium in 250 ml. of absolute ethanol 4.3 g. of 4,6-diamino-5-nitroso-2-phenylpyrimidine, followed by 6.6 g. of N,N'-bis(2-morpholinoethyl)malonamide. Stir and reflux the mixture for 1 hour. Evaporate the solution to dryness on a rotary evaporator. Treat the residual solid by filtration, wt.=5.0 g., M.P. 210° C. Recrystallize from ethanol to afford 4-amino - N - (2-morpholinoethyl)-7-(2-morpholinoethylamino)-2-phenyl-6-pteridinecarboxamide, M.P. 212° C.

Example 11

Add to a solution of 0.2 g. of sodium in 100 ml. of dry 2-ethoxyethanol 1.4 g. of 4,6-diamino-5-nitroso-2-n-propylpyrimidine and 2.09 g. of N,N'-bis(2-ethoxyethyl)-malonamide. Stir and leave the mixture under reflux for 30 mins. Evaporate the resulting amber solution to dryness to give an oil. Treat with water to obtain a solid and filter. Recrystallize from ethylacetate to afford 4 - amino - 7-(2-ethoxyethylamino)-N-(2-ethoxyethyl)-2-n-propyl-6-pteridinecarboxamide, M.P. 200° C.

Example 12

Add to a solution of 0.7 g. of sodium in 500 ml. of absolute ethanol 6.45 g. of 4,6-diamino-5-nitroso-2-phenylpyrimidine, followed by 9.0 g. N,N'-bis(3-ethoxypropyl)malonamide. Stir and boil the mixture under reflux for 15 mins. Cool to obtain a precipitate. Remove solid by filtration. Evaporate the filtrate to dryness on a rotary evaporator. Treat the residue with water to obtain a yellow material. Recrystallize from aqueous ethanol, followed by another recrystallization from ethylacetate/petrol to afford 4-amino-7-(3-ethoxypropylamino)-N-(3-ethoxypropyl) - 2-phenyl-6-pteridinecarboxamide, M.P. 157° C.

Example 13

Add to a solution of 0.2 g. of sodium in 250 ml. of absolute ethanol 4.30 g. of 4,6-diamino-5-nitroso-2-phenylpteridine, followed by 2.02 g. of malonamide. Stir and boil the mixture under reflux for 30 mins., to deposit a thick yellow precipitate from solution. Remove the solid material by filtration. Recrystallize from aqueous dimethylformamide to give 4,7-diamino-2-phenyl-6-pteridinecarboxamide, M.P. 360° C.

The herein disclosed compounds can be formulated for use in the same way as already known antiinflammatory, antibacterial and diuretic agents. That is to say, they can be formulated with the usual excipients, or with other active agents, into tablets or capsules for oral administration or dissolved under sterile conditions in a physiologically acceptable solvent for parenteral injection.

It will be apparent to chemists skilled in the art that the novel compounds of this invention are basic in nature. Acid addition salts of these compounds with organic and inorganic acids, such as fumaric acid, acetic acid or hydrochloric acid, therefore, can be prepared by methods well-known in the art.

What is claimed is:
1. 4-amino-N-(2-ethoxyethyl) - 7 - (2-ethoxyethylamino)-2-(2-thienyl)-6-pteridinecarboxamide.
2. 4-amino-N-(2-methoxyethyl)-7 - (2 - methoxyethylamino)-6-pteridinecarboxamide.
3. 4-amino-N-(2-ethylthioethyl)-7 - (2 - ethylthioethylamino)-2-phenyl-6-pteridinecarboxamide.
4. 4-amino-N-(2-methoxyethyl)-7 - (2 - methoxyethylamino)-2-(2-thienyl)-6-pteridinecarboxamide.
5. 4-amino-N-(2-diethylaminoethyl)-7-(2 - diethylaminoethylamino)-2-phenyl-6-pteridinecarboxamide.
6. 4-amino-N-(2-methoxyethyl)-7 - (2 - methoxyethylamino)-2-phenyl-6-pteridinecarboxamide.
7. 4-amino-2-(p-chlorophenyl)-N - (2-ethoxyethyl)-7-(2-ethoxyethylamino)-6-pteridineccarboxamide.
8. 4-amino-N-(2-ethoxyethyl)-7-(2 - ethoxyethylamino)-2-phenyl-6-pteridinecarboxamide.
9. 4-amino-N-(2-morpholinoethyl)-7 - (2 - morpholinoethylamino)-2-phenyl-6-pteridinecarboxamide.
10. 4-amino-7-(2 - ethoxyethylamino) - N - (2-ethoxyethyl)-2-n-propyl-6-pteridinecarboxamide.
11. 4-amino-7-(3-ethoxypropylamino) - N - (3-ethoxypropyl)-2-phenyl-6-pteridinecarboxamide.
12. A compound having the formula:

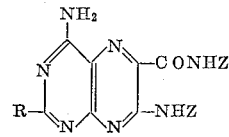

wherein R is selected from the group consisting of hydrogen, lower alkyl, phenyl and thienyl and Z is a member of the group consisting of diloweralkyl-amino lower alkyl, (lower)alkoxy(lower)alkyl, morpholino (lower)alkyl and (lower)alkyl-thio-(lower)alkyl.

References Cited by the Examiner
UNITED STATES PATENTS

| | | | |
|---|---|---|---|
| 2,975,180 | 3/1961 | Osdene | 260—251.5 |
| 3,122,540 | 2/1964 | Osdene | 260—251.5 |
| 3,122,543 | 2/1964 | Osdene | 260—251.5 |
| 3,122,546 | 2/1964 | Osdene | 260—251.5 |

OTHER REFERENCES

Timmis' Nature, vol. 164, July 3, 1949, page 139.

NICHOLAS S. RIZZO, *Primary Examiner.*
HENRY R. JILES, *Assistant Examiner.*